US009229211B2

(12) United States Patent
Yamamoto

(10) Patent No.: US 9,229,211 B2
(45) Date of Patent: Jan. 5, 2016

(54) IMAGING APPARATUS, IMAGING CONTROL PROGRAM, AND IMAGING METHOD

(71) Applicant: Sony Corporation, Tokyo (JP)

(72) Inventor: Takashi Yamamoto, Kanagawa (JP)

(73) Assignee: SONY CORPORATION, Tokyo (JP)

(*) Notice: Subject to any disclaimer, the term of this patent is extended or adjusted under 35 U.S.C. 154(b) by 387 days.

(21) Appl. No.: 13/755,966

(22) Filed: Jan. 31, 2013

(65) Prior Publication Data
US 2013/0215251 A1  Aug. 22, 2013

(30) Foreign Application Priority Data

Feb. 17, 2012 (JP) ................................ 2012-032637
Sep. 26, 2012 (JP) ................................ 2012-212185

(51) Int. Cl.
*H04N 9/47* (2006.01)
*G02B 21/36* (2006.01)

(52) U.S. Cl.
CPC .............. *G02B 21/36* (2013.01); *G02B 21/367* (2013.01)

(58) Field of Classification Search
USPC .............. 348/79, 77, 240.99, 598, 64, 49, 50, 348/137, 142, 143, 208.12, 218.1, 222.1, 348/262, 288, 294, 345, 350; 382/145, 199, 382/203, 224, 232; 356/124.5; 396/72, 82, 396/89, 103, 107, 124, 322, 326, 334; 359/368, 380, 383, 385, 390; 355/55, 355/62, 63
See application file for complete search history.

(56) References Cited

U.S. PATENT DOCUMENTS

| 6,282,020 B1* | 8/2001 | Ogino | G02B 21/0032 359/368 |
|---|---|---|---|
| 6,875,973 B2* | 4/2005 | Ortyn | G01N 15/1459 250/201.3 |
| 7,250,963 B2* | 7/2007 | Yuri et al. | 348/79 |
| 7,645,971 B2* | 1/2010 | Gouch | 250/201.2 |
| 2001/0026683 A1* | 10/2001 | Morimoto et al. | 396/89 |
| 2004/0200261 A1* | 10/2004 | Shuman | 73/1.79 |
| 2004/0256538 A1* | 12/2004 | Olson | G02B 21/002 250/201.3 |
| 2005/0286800 A1* | 12/2005 | Gouch | G02B 21/241 382/284 |
| 2006/0238847 A1* | 10/2006 | Gouch | G02B 7/38 359/202.1 |
| 2007/0147673 A1* | 6/2007 | Crandall | G02B 21/367 382/128 |
| 2007/0188650 A1* | 8/2007 | Kobayashi et al. | 348/344 |
| 2010/0194889 A1* | 8/2010 | Arndt | B60R 1/00 348/148 |
| 2010/0238327 A1* | 9/2010 | Griffith et al. | 348/240.99 |
| 2011/0096211 A1* | 4/2011 | Oikawa | G03B 13/36 348/273 |
| 2011/0157474 A1* | 6/2011 | Nagata | 348/598 |
| 2012/0013757 A1* | 1/2012 | Beckers et al. | 348/222.1 |

FOREIGN PATENT DOCUMENTS

JP       2012-014013       1/2012

* cited by examiner

*Primary Examiner* — Jefferey Harold
*Assistant Examiner* — Mustafizur Rahman
(74) *Attorney, Agent, or Firm* — Hazuki International, LLC

(57) ABSTRACT

An imaging apparatus includes: a first imaging area setting unit configured to divide an imaging range that includes a sample into a plurality of areas and set each of the plurality of areas as a first imaging area; a first imaging unit configured to capture a first image at an in-focus position of the first imaging area; a second imaging area setting unit configured to set an area that extends over adjacent first imaging areas as a second imaging area in a case where in-focus positions of the adjacent first imaging areas are so different from each other that the difference exceeds a predetermined value; a second imaging unit configured to capture a second image at an in-focus position of the second imaging area; and an image combining unit configured to combine the first image with the second image.

8 Claims, 7 Drawing Sheets

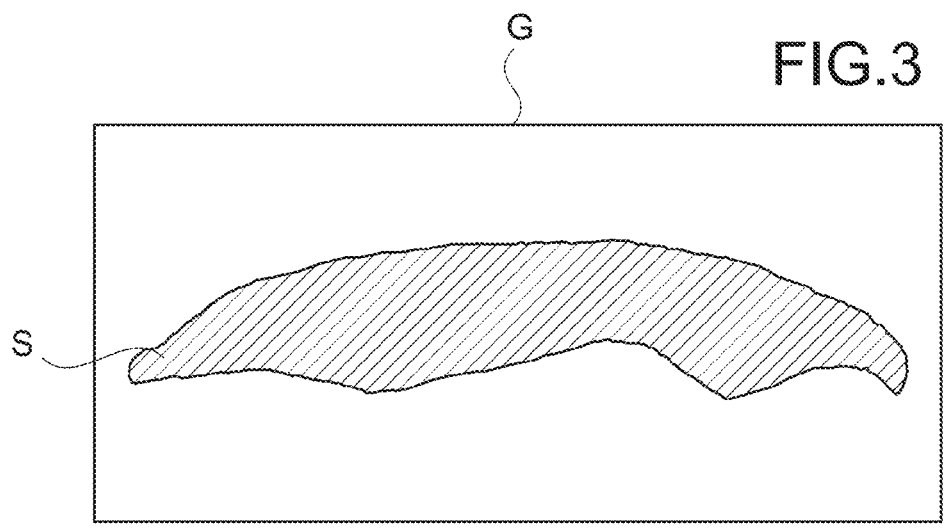
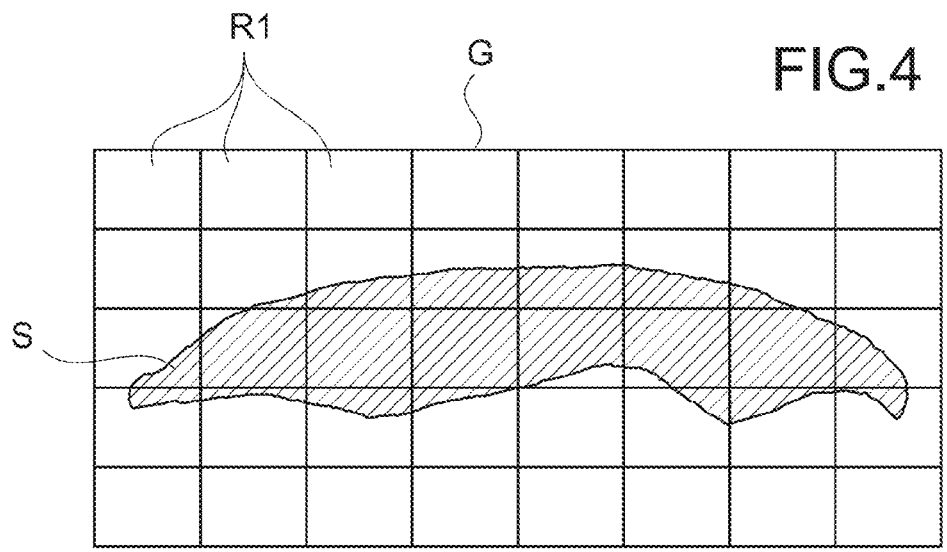

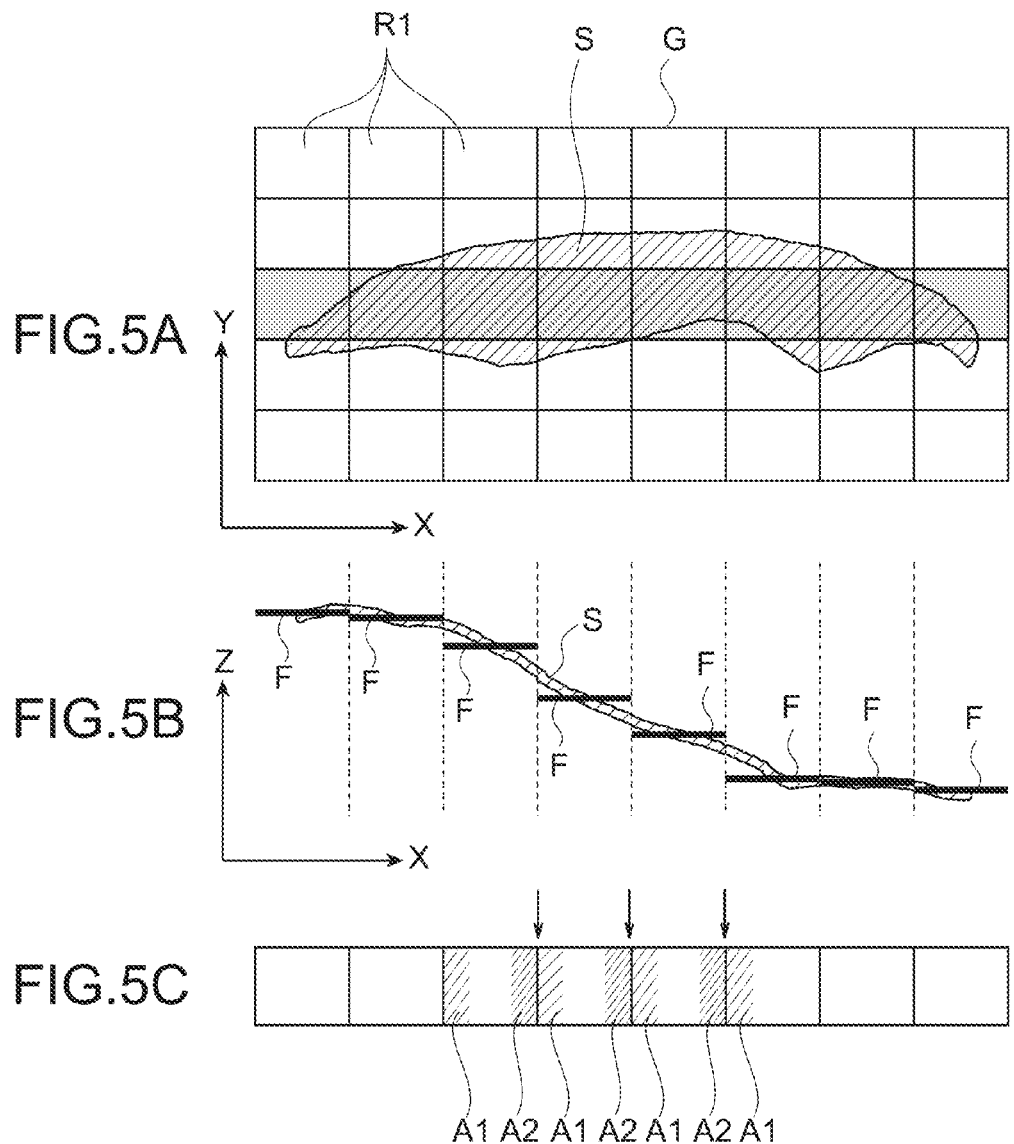

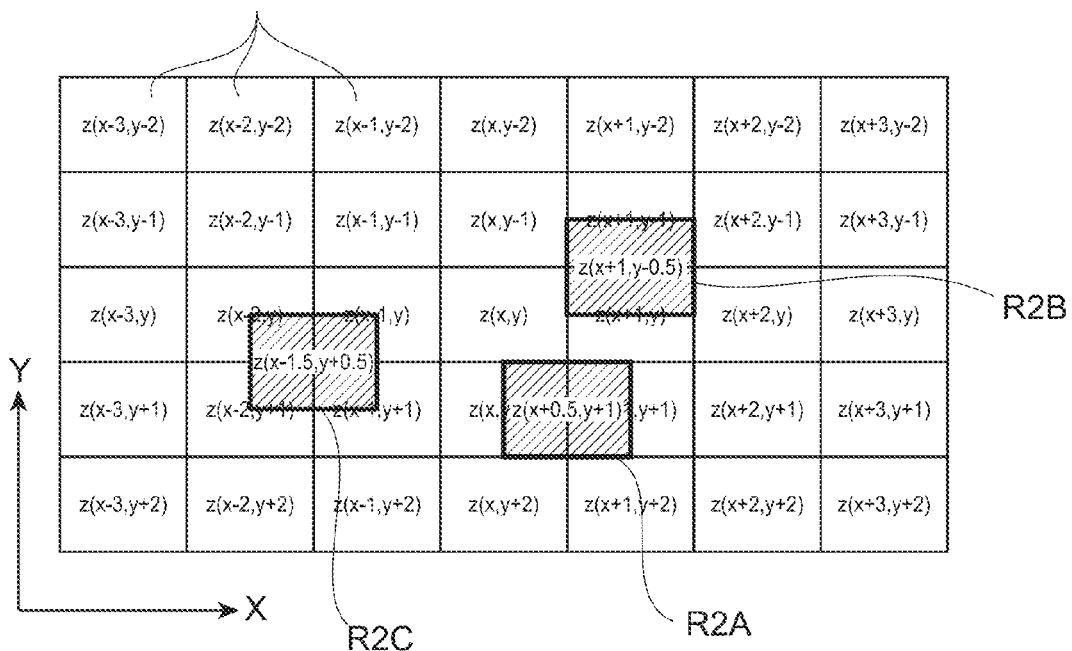

IMAGING APPARATUS, IMAGING CONTROL PROGRAM, AND IMAGING METHOD

CROSS REFERENCES TO RELATED APPLICATIONS

The present application claims priority to Japanese Priority Patent Application JP 2012-032637 filed in the Japan Patent Office on Feb. 17, 2012, and JP 2012-212185 filed in the Japan Patent Office on Sep. 26, 2012, the entire content of which is hereby incorporated by reference.

BACKGROUND

The present disclosure relates to an imaging apparatus that captures an image of a sample for each imaging area and obtains a high magnification image, an imaging control program, and an imaging method.

Some imaging apparatuses that capture a high magnification image of a sample by using a microscope can obtain a high magnification image of a sample by capturing a high magnification image for each partial area of the sample (imaging area) and combining the images thus obtained. For example, there has been known a DPI scanner or a DPI viewer in which an image of a cellular tissue is captured through a microscope and the image is stored as digital image data to be used for pathological diagnosis or the like.

For example, Japanese Patent Application Laid-open No. 2012-014013 (paragraph 0090 and FIG. 5) discloses "a microscope control apparatus" that forms a high magnification image in the whole imaging range by dividing the imaging range that includes a sample into a plurality of imaging areas, capturing a high magnification image for each of the imaging areas, and combining the high magnification images for the imaging areas with each other. When capturing a high magnification image for each of the imaging areas, the microscope control apparatus searches for an in-focus position of each of the imaging areas by using an autofocus function.

SUMMARY

In a case where a high magnification image is captured at an in-focus position of each imaging area as in the case of the microscope control apparatus described in Japanese Patent Application Laid-open No. 2012-014013 (paragraph 0090 and FIG. 5), the image obtained by combining the high magnification images captured for the imaging areas has noticeable boundaries between the imaging areas in some cases. The boundaries are caused in a case where in-focus positions of adjacent imaging areas are significantly different from each other. The difference is caused because an in-focus position is determined for each imaging area, and the boundaries are noticeable particularly in a case where a sample has an irregular thickness or a slope surface. In such a case, the combined high magnification image includes a discontinuous focused area at the boundaries between the imaging areas, which might cause inconvenience in visual observation or analysis with image processing.

In view of the circumstances as described above, it is desirable to provide an imaging apparatus that is capable of preventing an image from including a discontinuous focused area, which is formed because an image is captured for each imaging area, an imaging control program, and an imaging method.

According to an embodiment of the present disclosure, there is provided an imaging apparatus including a first imaging area setting unit, a first imaging unit, a second imaging area setting unit, a second imaging unit, and an image combining unit. The first imaging area setting unit divides an imaging range that includes a sample into a plurality of areas and sets each of the plurality of areas as a first imaging area. The first imaging unit captures a first image at an in-focus position of the first imaging area. The second imaging area setting unit sets an area that extends over adjacent first imaging areas as a second imaging area in a case where in-focus positions of the adjacent first imaging areas are so different from each other that the difference exceeds a predetermined value. The second imaging unit captures a second image at an in-focus position of the second imaging area. The image combining unit combines the first image with the second image.

According to this configuration, the second imaging areas that extend over the adjacent first imaging areas are set, and the second image is captured, in the case where the in-focus positions of the adjacent first imaging areas are so different from each other that the difference exceeds the predetermined value, specifically, in a case where a discontinuous focused area might be formed at the boundaries between the adjacent first imaging areas. Since the first image is combined with the second image, the boundaries between the adjacent first imaging areas are complemented with the second image that is captured with the second imaging areas crossing the boundaries. Thus, it is possible to prevent the combined image from including a discontinuous focused area at the boundaries between the adjacent first imaging areas.

The second imaging unit may set a center of the in-focus positions of the adjacent first imaging areas as an in-focus position of the second imaging area.

According to this configuration, it is possible to prevent the combined image of the first image and the second image from including a discontinuous focused area at the boundaries due to difference between the in-focus positions of the first imaging area and the second imaging area, because the difference is halved compared with that between the in-focus positions of the first images.

The first imaging unit may detect the in-focus position of the first imaging area by using a phase difference image of the first imaging area.

The detection of the in-focus position can be performed by a phase difference method in which an in-focus position is detected based on phase difference information included in a phase difference image, a contrast method in which the in-focus position of the image with the highest contrast in images captured at a plurality of in-focus positions is used, or the like. In a case where the phase difference method is employed, the in-focus position can be detected quickly, and the necessary time for an imaging process can be reduced.

The image combining unit may combine a central part of the first image with a central part of the second image.

In the case where the in-focus positions of the adjacent first imaging areas are so different from each other that the difference exceeds the predetermined value, although the detected in-focus position corresponds to the position of the sample at the central parts of the first image and the second image, the detected in-focus position is often separated from the position of the sample at end portions of the first image and the second image. Therefore, by combining the central part of the first image with the central part of the second image, it is possible to form an image that includes areas in which the in-focus positions of the first area and the second area are more close to the position of the sample, i.e., includes areas focused on the sample.

According to an embodiment of the present disclosure, there is provided an imaging control program that causes a computer to function as a first imaging area setting unit, a first imaging unit, a second imaging area setting unit, a second imaging unit, and an image combining unit. The first imaging area setting unit divides an imaging range that includes a sample into a plurality of areas and sets each of the plurality of areas as a first imaging area. The first imaging unit captures a first image at an in-focus position of the first imaging area. The second imaging area setting unit sets an area that extends over adjacent first imaging areas as a second imaging area in a case where in-focus positions of the adjacent first imaging areas are so different from each other that the difference exceeds a predetermined value. The second imaging unit captures a second image at an in-focus position of the second imaging area. The image combining unit combines the first image with the second image.

According to an embodiment of the present disclosure, there is provided an imaging method including:

dividing an imaging range that includes a sample into a plurality of areas and setting each of the plurality of areas as a first imaging area by a first imaging area setting unit;

capturing a first image at an in-focus position of the first imaging area by a first imaging unit;

setting an area that extends over adjacent first imaging areas as a second imaging area by a second imaging area setting unit in a case where in-focus positions of the adjacent first imaging areas are so different from each other that the difference exceeds a predetermined value;

capturing a second image at an in-focus position of the second imaging area by a second imaging unit; and combining the first image with the second image by an image combining unit.

As described above, according to the embodiments of the present disclosure, it is possible to provide an imaging apparatus that is capable of preventing an image from including a discontinuous focused area, which is formed because an image is captured for each imaging area, an imaging control program, and an imaging method.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIG. 3 shows an exemplary low magnification image of a prepared slide to be captured by the imaging apparatus;

FIG. 4 is a schematic diagram showing first imaging areas to be set by a first imaging area setting unit of the imaging apparatus;

FIGS. 5A to 5C are schematic diagrams showing a relationship between in-focus positions and a sample when an image is captured by a first imaging unit of the imaging apparatus;

FIG. 7 is a schematic diagram showing a second imaging area to be set by a second imaging area setting unit of the imaging apparatus and shows an example of disposition of second imaging areas R2.

DETAILED DESCRIPTION

Figure 1:
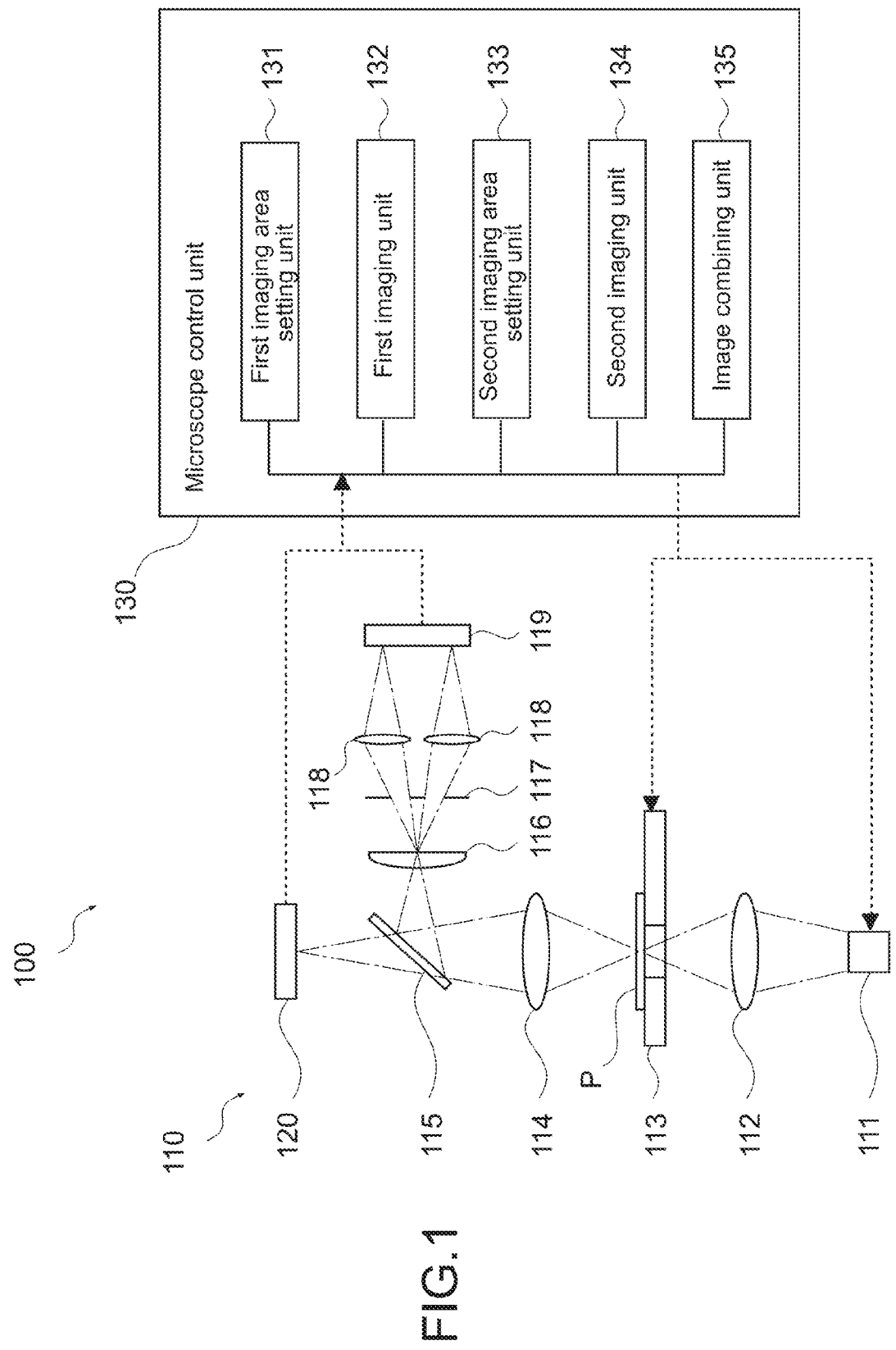
FIG. 1 is a schematic diagram showing a configuration of an imaging apparatus according to an embodiment of the present disclosure.

A configuration of an imaging apparatus according to an embodiment of the present disclosure will be described. FIG. 1 is a schematic diagram showing a configuration of an imaging apparatus 100 according to this embodiment. As shown in the figure, the imaging apparatus 100 includes a microscope 110 and a microscope control unit 130. Respective units of the microscope 110 are connected to the microscope control unit 130. It should be noted that the microscope control unit 130 may be mounted on the microscope 110, an information processing apparatus other than the microscope 110, or the like.

The microscope 110 captures a high magnification image of a sample under control of the microscope control unit 130. The microscope 110 may capture a phase difference image of the sample in addition to the high magnification image.

The microscope 110 includes a light source 111, a condenser lens 112, a stage 113, an objective lens 114, a half mirror 115, a field lens 116, an aperture mask 117, separator lenses 118, an image sensor 19, and an image sensor 120. On the stage 113, a prepared slide P to which a sample is fixed is placed. It should be noted that a configuration of the microscope 110 shown in the figure is only an example, and the microscope 110 can have a different configuration.

The light source 111 emits illumination light to be applied to the prepared slide P. The light source 111 may be a light bulb, an LED (Light Emitting Diode), or the like. Light emission timing or the like of the light source 111 is controlled by the microscope control unit 130. The condenser lens 112 condenses the illumination light emitted from the light source 111 onto the prepared slide P.

The stage 113 supports the prepared slide P, and moves in an X-Y plane (plane parallel to the prepared slide P) direction and a Z direction (direction perpendicular to the prepared slide P) under control of the microscope control unit 130. The stage 113 may define a field of view range of a microscope optical system (objective lens 114 or the like) by moving in the X-Y plane direction, and may determine an in-focus position of the microscope optical system by moving in the Z direction.

The objective lens 114 magnifies light transmitted through the prepared slide P by a predetermined magnification. The objective lens 114 may include a plurality of lenses having different magnifications.

The half mirror 115 reflects a part of light transmitted through the objective lens 114, and the other part of the light is transmitted through the half mirror 115. The half mirror 115 separates light into light to be used to form a phase difference image and light to be used to form a normal microscope image (other than the phase difference image). The field lens 116 refracts the light reflected by the half mirror 115 so that the light is incident on the aperture mask 117.

The aperture mask 117 divides the light refracted by the field lens 116 so that the divided light is incident on the separator lenses 118. The aperture mask 117 may be provided with a pair of apertures being a light path at symmetrical positions around an optical axis of the field lens 116 on a surface orthogonal to the optical axis.

A pair of separator lenses 118 is disposed in the microscope 110, and the pair of separator lenses 118 couples the light divided by the aperture mask 117 to a light-receiving surface of the image sensor 119. The image sensor 119 photoelectrically converts the light coupled to the light-receiving surface by the pair of separator lenses 118 to form a phase difference image. The image sensor 119 may be a CCD (Charge Coupled Device) image sensor, a CMOS (Complementary Metal Oxide Semiconductor) image sensor, or the like. The image sensor 119 outputs the formed phase difference image to the microscope control unit 130.

The image sensor 120 photoelectrically converts the light transmitted through the half mirror 115 to form images (low magnification and high magnification images) of the sample. The image sensor 120 may be a CCD image sensor, a CMOS image sensor, or the like. The image sensor 120 outputs the formed images to the microscope control unit 130.

The microscope control unit 130 is realized by cooperation of hardware such as a processor and a memory and software read therein. The microscope control unit 130 obtains an image output from the microscope 110, and controls capturing of an image performed by the microscope 110.

The microscope control unit 130 includes a first imaging area setting unit 131, a first imaging unit 132, a second imaging area setting unit 133, a second imaging unit 134, and an image combining unit 135. These units are connected with each other and are connected to the imaging apparatus 100. The function of the respective units of the microscope control unit 130 will be described together with the operation of the imaging apparatus 100.

(Operation of Imaging Apparatus)

Figure 2:
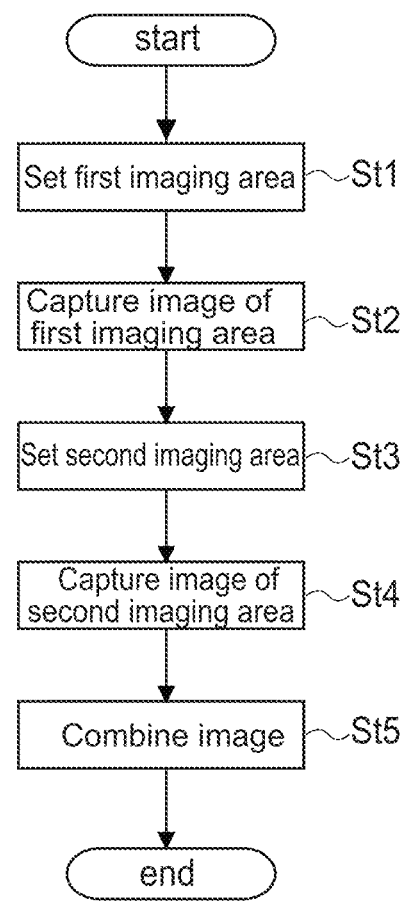
FIG. 2 is a flowchart showing an operation of the imaging apparatus.

The operation of the imaging apparatus 100 will be described. FIG. 2 is a flowchart showing the operation of the imaging apparatus 100.

The prepared slide P is placed on the stage of the microscope 110, and a user performs an input operation for starting capturing of an image. Thus, an imaging process is started. FIG. 3 shows, as a low magnification image G, a low magnification image of the prepared slide P to be captured. The imaging apparatus 100 operates to capture a high magnification image of the low magnification image G. The low magnification image G includes an image of a sample (e.g., cellular tissue) S.

The first imaging area setting unit 131 sets first imaging areas R1 on the low magnification image G (SU). FIG. 4 is a schematic diagram showing the first imaging areas R1. The first imaging areas R1 are virtual areas that have the same size and are disposed on the low magnification image G. The size and number of the first imaging areas R1 are determined depending on the size of the low magnification image G and the magnification of the desired high magnification image. In fact, several hundreds to several thousands of imaging areas R1 are set on one low magnification image G.

Next, the first imaging unit 132 captures a high magnification image of each of the first imaging areas R1 (hereinafter referred to as a first image) (St2). Specifically, the first imaging unit 132 controls the stage 113, the light source 111, and the like, and a field of view of the microscope 110 is set to correspond to one of the first imaging areas R1. The first imaging unit 132 detects an in-focus position of the first imaging area R1.

The in-focus position is a relative position (distance) between the microscope optical system and the prepared slide P in a case where the microscope 110 is most focused on the image of the sample S included in the first imaging area R1. The first imaging unit 132 may detect the in-focus position of the first imaging area R1 by using a phase difference image of the first imaging area R1, which is captured by the image sensor 119.

The first imaging unit 132 does not necessarily use the phase difference image, and may employ the contrast method in which the in-focus position of the image with the highest contrast, in images captured at a plurality of in-focus positions, is used. However, in the case where the phase difference method is employed, the in-focus position can be detected quickly, and the necessary time for the imaging process can be reduced.

The first imaging unit 132 uses the in-focus position detected in the first imaging area R1 to capture, by the image sensor 120, the magnification image of the first imaging area R1 (first image). The first imaging unit 132 stores the captured first image in storage or the like.

Next, the first imaging unit 132 controls the stage 113 and the like, and moves the field of view of the microscope 110 to a next first imaging area R1. Images of the first imaging areas R1 can be captured in any order, and may be sequentially captured for each column, for example. The first imaging unit 132 detects an in-focus position of the next first imaging area R1 similarly, and captures the first image at the in-focus position. By repeating the process, the first imaging unit 132 captures a high magnification image for each of the first imaging areas R1 on the low magnification image G, and stores the first images thus obtained.

Now, a case where the first images captured for the first imaging areas R1 are combined with each other as they are to form a high magnification image of the sample S will be considered. FIGS. 5A to 5C are schematic diagrams showing a relationship between a sample and in-focus positions. FIG. 5A is a diagram of the sample S as viewed from a direction (Z direction) perpendicular to a plane (X-Y plane) parallel to the prepared slide P. FIG. 5B is a diagram of the sample S as viewed from a direction (Y direction) parallel to the prepared slide P. FIG. 5C is a schematic diagram showing an image obtained by combining the images of the first imaging areas R1 (first images).

The assumption is made that the first imaging unit 132 captures images of the first imaging areas R1 (shown with hatching) disposed in a line in an X direction shown in FIG. 5A. FIG. 5B shows, as in-focus positions F, in-focus positions of the first imaging areas R1 shown with hatching in FIG. 5A. As shown in FIG. 5B, difference between the in-focus positions of the first imaging areas R1 in which the sample S has a slightly uneven surface is small. On the other hand, difference between the in-focus positions of the first imaging areas R1 in which the sample S has a markedly uneven (tilted) surface is large.

As a result, in an image obtained by combining the first images shown in FIG. 5C, boundaries between the first images are noticeable, as indicated by arrows in the figure. In FIG. 5C, the in-focus position F of the left-hand area of each of the first images (imaging area A1) is separated under the sample S, and the in-focus position F of the right-hand area of each of the first images (imaging area A2) is separated above the sample S.

Since the in-focus positions F of the imaging area A1 and the imaging area A2 are separated from the sample S, an unfocused image is formed. The imaging area A1 in which the in-focus position F is under the sample S (distant from the position of the sample S) and the imaging area A2 in which the in-focus position F is above the sample S (close to the position of the sample S) have different shade or the like due to chromatic aberration of the optical system, thereby making the boundaries between the first images noticeable.

Although the first imaging areas R1 have been described in relation to only one direction (X direction) the same shall apply to a different direction (Y direction or oblique direction). That is, in a case where the sample S has a markedly uneven surface and the first images captured for the first imaging areas R1 are combined as they are, a high magnification image that includes a discontinuous focused area at the boundaries between the first imaging areas R1 is formed.

This embodiment addresses this problem as follows. The first imaging unit 132 captures a high magnification image for each of the first imaging areas R1 (first image) (St2) before the second imaging area setting unit 133 sets the second imaging areas R2 on the low magnification image G (St3).

Figure 6A:
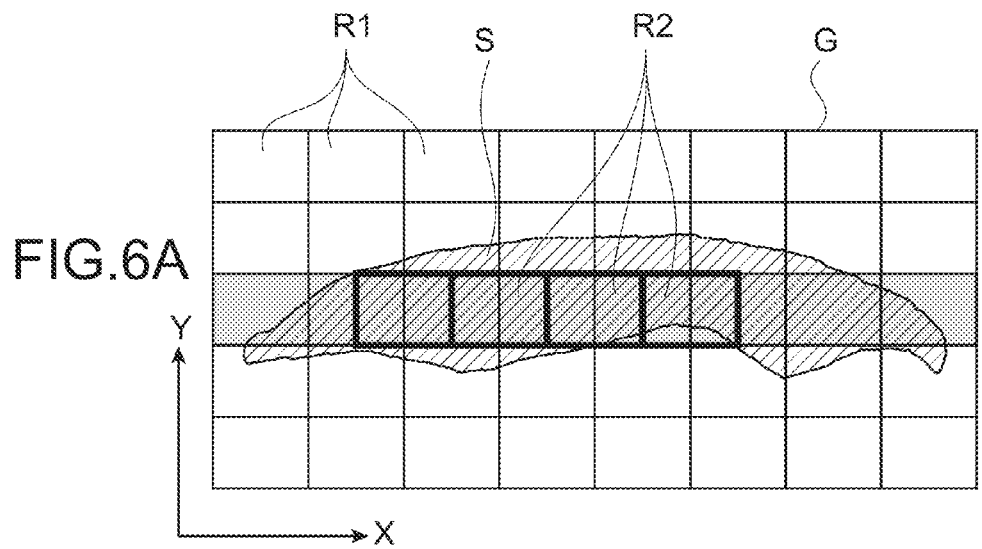
FIGS. 6A to 6E are schematic diagrams showing a relationship between in-focus positions and the sample when an image is captured by a second imaging unit of the imaging apparatus.
Figure 6B:
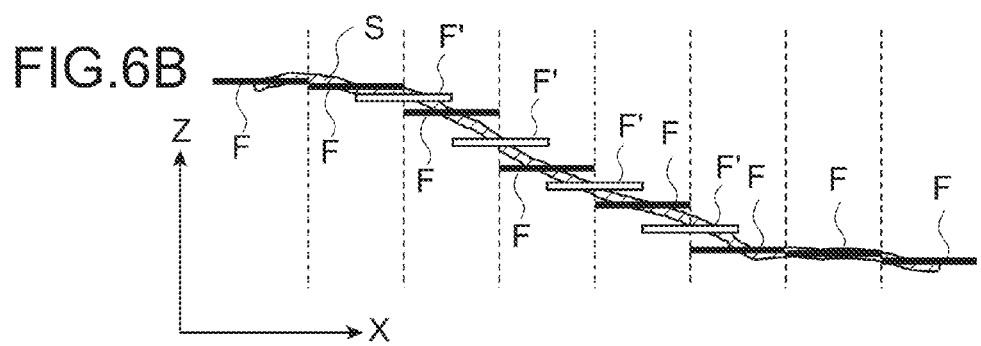
Figure 6C:
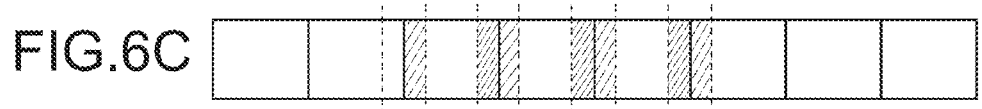
Figure 6D:
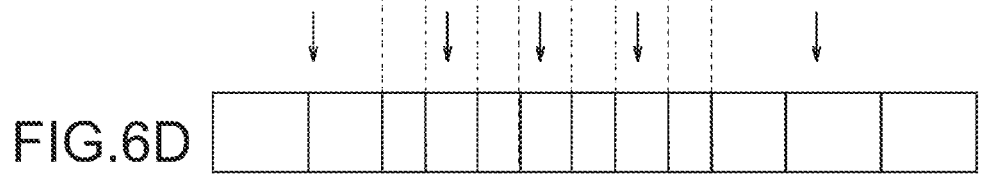
Figure 6E:
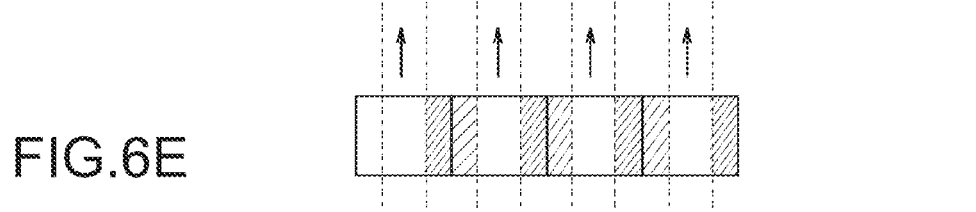

FIGS. 6A to 6C are schematic diagrams showing the second imaging areas R2 in the low magnification image G. FIG. 6A is a diagram of the sample S as viewed from a direction (Z direction) perpendicular to a plane (X-Y plane) parallel to the prepared slide P. FIG. 6B is a diagram of the sample S as viewed from a direction (Y direction) parallel to the prepared slide P. FIG. 6C is a schematic diagram showing an image obtained by combining the images of the first imaging areas R1 (first images). FIG. 6E shows an image obtained by combining images of the second imaging areas R2 (second images). FIG. 6D is a schematic diagram showing an image obtained by combining the first images and the second images.

As shown in FIG. 6A, the second imaging area setting unit 133 sets the second imaging areas R2 so that each second imaging area R2 extends over a pair of adjacent first imaging areas R1 whose in-focus positions detected by the first imaging unit 132 are separated from each other, in pairs of adjacent first imaging areas R1. In a case where the in-focus positions of the adjacent first imaging areas R1 exceeds a threshold value (e.g., n times of the depth of field of the microscope optical system), the second imaging area setting unit 133 may set the second imaging area R2 for the pair of the adjacent first imaging areas R1.

It should be noted that in FIGS. 6, the second imaging areas R2 are set, in only one direction (X direction), for pairs of the first imaging areas R whose in-focus positions F are separated with each other. However, in fact, in a case where the in-focus positions F are so separated from each other that the difference exceeds a threshold value also in a different direction (Y direction or oblique direction), the second imaging areas R2 are set so that each second imaging area extends over the pair of the first imaging areas R1 in the different direction. This setting of the second imaging areas R2 in the different direction will be described later.

As shown in FIG. 6A, the second imaging area setting unit 133 can set the second imaging areas R2 so that the boundaries between the first imaging areas R1 are located at the center of the second imaging areas R2. Moreover, the second imaging area setting unit 133 does not necessarily set the second imaging areas R2 as described above, and may set the second imaging areas R2 so that the second imaging areas R2 at least extend over the pair of the first imaging areas R1.

Next, the second imaging unit 134 captures images of the second imaging areas R2 (St4). Specifically, the second imaging unit 134 controls the stage 113 and the like, and moves the field of view of the microscope 110 to one of the second imaging areas R2. As shown in FIG. 6B, the second imaging unit 134 sets, as in-focus positions (hereinafter referred to as in-focus positions F'), the center positions of the in-focus positions F of the pairs of the first imaging areas R1 over which the second imaging areas R2 extend. The second imaging unit 134 uses the in-focus positions F' to capture images of the second imaging areas R2 by the image sensor 120, and the captured images are stored in storage or the like.

Next, the second imaging unit 134 moves the field of view of the microscope 110 to a next second imaging area R2, and captures a second image for the next second imaging area R2. Subsequently, the second imaging unit 134 repeats this process until images of all of the second imaging areas R2 are captured. The second imaging unit 134 can capture images of the second imaging areas R2 in any order.

As shown in FIG. 6E, the second images captured for the second imaging areas R2 are focused on areas being the boundaries between the first images (end portions of the first images) in an image obtained by combining the first images shown in FIG. 6C.

Next, the image combining unit 135 combines the first images and the second images (St5). As shown in FIG. 6D, the image combining unit 135 combines the central parts of the first images (FIG. 6C) with the central parts of the second images (FIG. 6E) based on the positions on the low magnification image G. The first image of the first imaging area R1 to which the second imaging area R2 is not set can be used as it is. Accordingly, in an image obtained by combining the first images and the second images shown in FIG. 6D (hereinafter referred to as a combined image), unfocused areas (shaded areas) of end portions of the first images and the second images are cut, and a completely focused combined image is formed.

As described above, the boundaries between the first images caused due to the distance of the in-focus position from the sample S, which is caused because the sample S has an uneven surface, can be eliminated by being combined with the second images. In other words, the combined image may be a magnification image with high quality that does not have noticeable boundaries between imaging areas.

It should be noted that in the above description, although the difference between the in-focus positions of the first imaging areas R1 in one direction (X direction) has been considered, difference between in-focus positions may be caused also in a different direction (Y direction or oblique direction), actually. FIG. 7 is a schematic diagram showing an example of disposition of the second imaging areas R2.

In the first imaging areas R1 shown in FIG. 7, in-focus positions (z(x+1, y+1) and the like) in the coordinates ((x+1, y+1) and the like) of the first imaging areas R1 are indicated with the coordinates of the center first imaging area R1 being (x, y). FIG. 7 shows disposition of the second imaging areas R2 in a case where in-focus positions of the first imaging areas R1 are so different that the difference exceeds a threshold value. Specifically, a second imaging area R2A extends over the first imaging areas R1 in an X direction, a second imaging area R2B extends over the first imaging areas R1 in a Y direction, and a second imaging area R2C extends over the first imaging areas R1 in the X and Y directions.

The second imaging area R2A shows disposition of a second imaging area R2 in a case where in-focus positions of a first imaging area R1 (x, y+1) and a first imaging area R1 (x+1, y+1) are so different from each other that the difference exceeds a threshold value (Zth), i.e., the following equation (1) is satisfied.

The second imaging area R2B shows disposition of a second imaging area R2 in a case where in-focus positions of a first imaging area R1 (x+1, y−1) and a first imaging area R1 (x+1, y) are so different from each other that the difference exceeds the threshold value (Zth), i.e., the following equation (2) is satisfied.

The second imaging area R2C shows disposition of a second imaging area R2 in a case where in-focus positions of a first imaging area R1 (x−2, y) and a first imaging area R1

(x−1, y+1) are so different from each other that the difference exceeds the threshold value (Zth), i.e., the following equation (3) is satisfied.

$$|z(x, y+1)-z(x+1, y+1)|>Zth \quad (1)$$

$$|z(x+1, y-1)-z(x+1, y)|>Zth \quad (2)$$

$$|z(x-2, y)-z(x-1, y+1)|>Zth \quad (3)$$

In a case where in-focus positions of adjacent first imaging areas R1 in each direction are so different that the difference exceeds a threshold value as in the case of the second imaging area R2A, the second imaging area R2B, and the second imaging area R2C, the second imaging area setting unit 133 can set the second imaging areas R2 so that each second imaging area R2 extends over the first imaging areas R1 in the corresponding direction. Therefore, the second imaging area setting unit 133 compares an in-focus position of one first imaging area R1 with in-focus positions of eight first imaging areas R1, i.e., first imaging areas R1 located in up, down, left, right, and diagonal directions of the one first imaging area R1, and can set the second imaging areas R2 for the first imaging areas R1 in which the difference exceeds the threshold value.

Figure 8A:
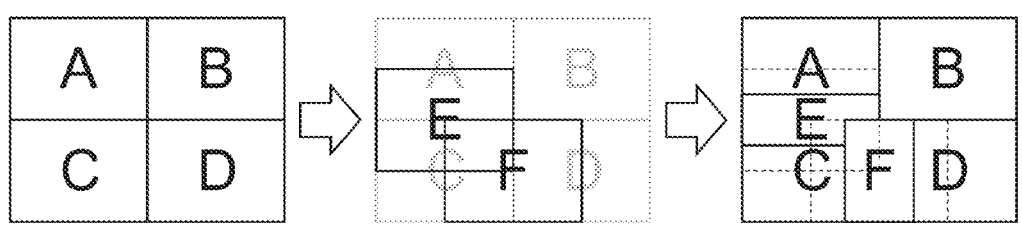
FIGS. 8A and 8B are schematic diagrams showing how a first image and a second image are combined by an image combining unit of the imaging apparatus.
Figure 8B:
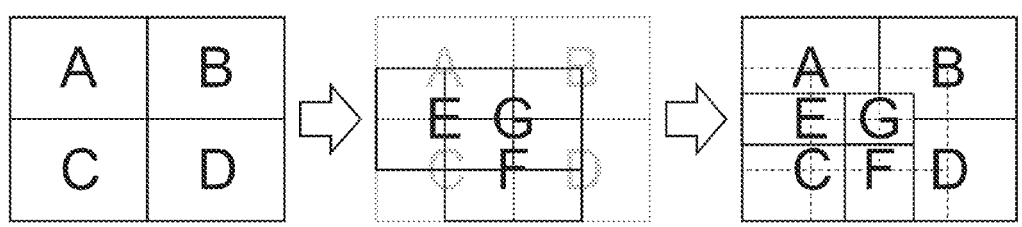

In this case, the image combining unit 135 may combine the first images with the second images in a plurality of directions. FIGS. 8A and 8B are schematic diagrams showing how the first images and the second images are combined. As shown in FIGS. 8A, the image combining unit 135 can combine first combined images (A, B, C, and D) with second combined images (E and F) in two directions (X direction and Y direction). Moreover, as shown in FIG. 8B, the image combining unit 135 can combine the first combined images (A, B, C, and D) with the second combined images (E and F) and a second combined image (G) in three directions (X direction, Y direction, and oblique direction). In any case, the boundaries between the first images are complemented with the second images, and the combined image of the first images is prevented from including a discontinuous focused area.

Moreover, the second imaging area setting unit 133 can set a plurality of second imaging areas R2 between the pair of the first imaging areas R1 in a stepwise manner. In a case where the difference between the in-focus positions of the adjacent first imaging areas R1 is huge, the second imaging area setting unit 133 disposes a plurality of second imaging areas R2 between the adjacent first imaging areas R1. The second imaging unit 134 uses a plurality of in-focus positions obtained by dividing the in-focus positions of the adjacent first imaging areas R1 to capture images of the second imaging areas R2, and thus the second images are formed in each second imaging area R2. Accordingly, even if the sample S has a markedly uneven surface, the high magnification image is prevented from having a discontinuous focused area that is caused due to the difference between the in-focus positions.

It should be noted that in the above description, although the first imaging unit 132 captures images of the first imaging areas R1 before the second imaging area setting unit 133 sets the second imaging areas R2 and then the second imaging unit 134 captures images of the second imaging areas R2, the process is not necessarily performed in the stated order. The second imaging area setting unit 133 can set the second imaging areas R2 at the same time as the first imaging unit 132 captures the images of the first imaging areas R1, and the second imaging unit 134 can capture images of the second imaging areas R2 successively.

As described above, a high magnification image of the sample S (combined image of the first images and the second images) is formed by the imaging apparatus 100. As described above, in the case where the in-focus positions of the adjacent first imaging areas R1 are so different from each other that the difference exceeds the predetermined value, specifically, in the case where the boundaries between the adjacent first imaging areas may be noticeable, the boundaries between the adjacent first imaging areas are complemented with the second images that are captured so that each second image extends over the boundaries. Therefore it is possible to prevent the boundaries in the combined image from being noticeable, i.e., to prevent the combined image from including a discontinuous focused area.

It should be noted that the present disclosure may employ the following configurations.

(1) An imaging apparatus, including:
a first imaging area setting unit configured to divide an imaging range that includes a sample into a plurality of areas and set each of the plurality of areas as a first imaging area;
a first imaging unit configured to capture a first image at an in-focus position of the first imaging area;
a second imaging area setting unit configured to set an area that extends over adjacent first imaging areas as a second imaging area in a case where in-focus positions of the adjacent first imaging areas are so different from each other that the difference exceeds a predetermined value;
a second imaging unit configured to capture a second image at an in-focus position of the second imaging area; and
an image combining unit configured to combine the first image with the second image.

(2) The imaging unit according to (1), in which
the second imaging unit is configured to set a center of the in-focus positions of the adjacent first imaging areas as an in-focus position of the second imaging area.

(3) The imaging unit according to (1) or (2), in which
the first imaging unit is configured to detect the in-focus position of the first imaging area by using a phase difference image of the first imaging area.

(4) The imaging unit according to any one of (1) to (3), in which
the image combining unit is configured to combine a central part of the first image with a central part of the second image.

(5) An imaging control program that causes a computer to function as:
a first imaging area setting unit configured to divide an imaging range that includes a sample into a plurality of areas and set each of the plurality of areas as a first imaging area;
a first imaging unit configured to capture a first image at an in-focus position of the first imaging area;
a second imaging area setting unit configured to set an area that extends over adjacent first imaging areas as a second imaging area in a case where in-focus positions of the adjacent first imaging areas are so different from each other that the difference exceeds a predetermined value;
a second imaging unit configured to capture a second image at an in-focus position of the second imaging area; and
an image combining unit configured to combine the first image with the second image.

(6) An imaging method, including:
dividing an imaging range that includes a sample into a plurality of areas and setting each of the plurality of areas as a first imaging area by a first imaging area setting unit;

capturing a first image at an in-focus position of the first imaging area by a first imaging unit;

setting an area that extends over adjacent first imaging areas as a second imaging area by a second imaging area setting unit in a case where in-focus positions of the adjacent first imaging areas are so different from each other that the difference exceeds a predetermined value;

capturing a second image at an in-focus position of the second imaging area by a second imaging unit; and combining the first image with the second image by an image combining unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An imaging apparatus, comprising:
a first imaging area setting unit configured to divide an imaging range that includes a sample into a plurality of areas and set each of the plurality of areas as a first imaging area;
a first imaging unit configured to capture a first image at an in-focus position of the first imaging area;
a second imaging area setting unit configured to set a second imaging area that includes a portion of a pair of adjacent first imaging areas;
a second imaging unit configured to capture a second image at an in-focus position of the second imaging area;
an image combining unit configured to combine the first image with the second image; and
wherein the in-focus position of the pair of adjacent first imaging areas is different.

2. The imaging unit according to claim 1, wherein the second imaging unit is configured to set a center of the in-focus positions of the adjacent first imaging areas as an in-focus position of the second imaging area.

3. The imaging unit according to claim 1, wherein the first imaging unit is configured to detect the in-focus position of the first imaging area by using a phase difference image of the first imaging area.

4. The imaging unit according to claim 1, wherein the image combining unit is configured to combine a central part of the first image with a central part of the second image.

5. An imaging control program stored in a non-transitory computer readable medium for causing a computer to function as:
a first imaging area setting unit configured to divide an imaging range that includes a sample into a plurality of areas and set each of the plurality of areas as a first imaging area;
a first imaging unit configured to capture a first image at an in-focus position of the first imaging area;
a second imaging area setting unit configured to set a second imaging area that includes a portion of a pair of adjacent first imaging areas;
a second imaging unit configured to capture a second image at an in-focus position of the second imaging area;
an image combining unit configured to combine the first image with the second image; and
wherein the in-focus position of the pair of adjacent first imaging areas is different.

6. An imaging method, comprising:
dividing an imaging range that includes a sample into a plurality of areas and setting each of the plurality of areas as a first imaging area by a first imaging area setting unit;
capturing a first image at an in-focus position of the first imaging area by a first imaging unit;
setting a second imaging area that includes a portion of a pair of adjacent first imaging areas;
capturing a second image at an in-focus position of the second imaging area by a second imaging unit; and
combining the first image with the second image by an image combining unit;
wherein the in-focus position of the pair of adjacent first imaging areas is different.

7. The imaging unit according to claim 1, wherein the first image unit captures a high magnification image for the first imaging area before the second imaging area setting unit sets the second imaging area on a low magnification image.

8. The imaging unit according to claim 1, wherein the second imaging area includes a half size imaging area from each of the pair of adjacent first imaging areas.

* * * * *